United States Patent [19]
Cable et al.

[11] Patent Number: 5,910,238
[45] Date of Patent: Jun. 8, 1999

[54] MICROSPHERES FOR COMBINED OXYGEN SEPARATION, STORAGE AND DELIVERY

[75] Inventors: Thomas L. Cable, Newbury; Michael A. Petrik, Highland Hts.; Benson P. Lee, Cleveland, all of Ohio

[73] Assignee: Technology Management, Inc., Cleveland, Ohio

[21] Appl. No.: 08/995,580

[22] Filed: Dec. 22, 1997

Related U.S. Application Data

[62] Division of application No. 08/457,863, Jun. 1, 1995, Pat. No. 5,766,317.

[51] Int. Cl.$^6$ ............................. B01D 53/00; B01D 53/32
[52] U.S. Cl. .................. 205/634; 205/765; 95/54
[58] Field of Search ...................... 205/633, 634, 205/765; 95/54

[56] References Cited

U.S. PATENT DOCUMENTS

| | | | |
|---|---|---|---|
| 4,302,311 | 11/1981 | Lowe et al. | 204/192 R |
| 4,316,786 | 2/1982 | Yu et al. | 204/223 |
| 4,328,768 | 5/1982 | Tracey et al. | 123/1 A |
| 4,330,633 | 5/1982 | Yoshisato et al. | 501/152 |
| 4,436,715 | 3/1984 | Schaap et al. | 423/579 |
| 4,475,994 | 10/1984 | Gagne et al. | 204/265 |
| 4,738,760 | 4/1988 | Marianowski et al. | 204/130 |
| 4,791,079 | 12/1988 | Hazbun | 502/4 |
| 4,793,980 | 12/1988 | Torbain | 423/213.5 |
| 4,812,329 | 3/1989 | Isenberg | 427/115 |
| 4,885,142 | 12/1989 | Suitor et al. | 204/265 |
| 4,943,355 | 7/1990 | Patterson | 204/20 |
| 5,007,992 | 4/1991 | Weber | 204/59 R |
| 5,021,137 | 6/1991 | Joshi et al. | 204/242 |
| 5,035,727 | 7/1991 | Chen | 55/16 |
| 5,108,465 | 4/1992 | Bauer et al. | 55/16 |
| 5,160,618 | 11/1992 | Burggraff | 210/490 |

(List continued on next page.)

FOREIGN PATENT DOCUMENTS

| | | |
|---|---|---|
| 399833 | 11/1990 | European Pat. Off. . |
| 405288 | 1/1991 | European Pat. Off. . |
| 56-92103 | 7/1981 | Japan . |
| 57-123833 | 8/1982 | Japan . |
| 57-145070 | 9/1982 | Japan . |
| 57-160967 | 10/1982 | Japan . |
| 58-64258 | 4/1983 | Japan . |
| 61-21717 | 1/1986 | Japan . |

OTHER PUBLICATIONS

Tuller, H.L. et al "Doped Ceria as a Solid Oxide Electrolyte" Journal of Electrochemical Society Feb. 1975 pp. 255–259.

Service, Robert F., "Small Spheres Lead to Big Ideas" Science, vol. 267, Jan. 20, 1995, pp. 327–329.

Hendricks, Charles D., "Glass Spheres" Engineered Materials Handbook, vol. 4, Ceramics & Glasses, ASM International 1991, pp. 418–422, (no month available).

*Primary Examiner*—Kishor Mayekar
*Attorney, Agent, or Firm*—Renner, Kenner, Greive, Bobak, Taylor & Weber.

[57] ABSTRACT

An article for the separation, storage and delivery of substantially pure oxygen, comprises a closed walled, hollow container wherein at least a portion of at least one wall of the container is an oxygen separation material, providing a sole means for transporting substantially all oxygen into the container. An apparatus for the delivery of oxygen comprises means for transferring oxygen from a fluid containing oxygen to at least one such container at elevated temperature and pressure. The apparatus can provide means for transporting said the substantially pure oxygen-bearing container, means for storing said the container, and means for extracting oxygen from the container. A process includes filling the article with substantially pure oxygen, and, storing the substantially pure oxygen within the container for a selected period of time. The process may include releasing the oxygen from the container. The process may be used for the purification of oxygen, or the purification of a fluid containing oxygen as an impurity.

16 Claims, 3 Drawing Sheets

U.S. PATENT DOCUMENTS

| | | | |
|---|---|---|---|
| 5,169,415 | 12/1992 | Roettger et al. | 204/252 |
| 5,186,805 | 2/1993 | Gross et al. | 204/265 |
| 5,240,473 | 8/1993 | Carolan et al. | 95/54 |
| 5,240,480 | 8/1993 | Thorogood et al. | 96/4 |
| 5,261,932 | 11/1993 | Carolan et al. | 95/54 |
| 5,269,822 | 12/1993 | Carolan et al. | 95/54 |
| 5,273,628 | 12/1993 | Liu et al. | 204/59 R |
| 5,306,411 | 4/1994 | Mazanec et al. | 204/265 |
| 5,332,483 | 7/1994 | Gordon | 204/265 |
| 5,401,372 | 3/1995 | Liu et al. | 204/265 |
| 5,534,471 | 7/1996 | Carolan et al. | 502/4 |
| 5,611,898 | 3/1997 | Guhman et al. | 204/262 |
| 5,647,970 | 7/1997 | Arata | 205/765 |
| 5,723,035 | 3/1998 | Mazanec et al. | 204/295 |

○ Oxygen
● Non Oxygen Molecules
e⁻ Electrons

○ Oxygen
● Non Oxygen Molecules
e⁻ Electrons

MICROSPHERES FOR COMBINED OXYGEN SEPARATION, STORAGE AND DELIVERY This application is a divisional application of application U.S. Ser. No. 08/457,863 filed on Jun. 1, 1995, now U.S. Pat. No. 5,766,317.

TECHNICAL FIELD

The present invention is directed to the separation of pure oxygen from oxygen-containing gas mixtures and for the storage and delivery of the pure oxygen. More particularly, it is directed to the use of gas-tight, hollow containers, composed of a solid oxygen-transport material which conducts both oxygen ions and electrons, for the separation, storage, and delivery of pure oxygen.

BACKGROUND OF THE INVENTION

Molecular oxygen is widely used in many industries and in many processes such as steel production, glass making, wastewater treatment, and in energy production via chemical oxidation and combustion processes. While the use of pure molecular oxygen is desirable, the separation and storage of molecular oxygen has been heretofore difficult, hazardous, and expensive.

Cryogenic distillation, the liquefaction and rectification of air, is commonly used to separate oxygen from other gases to obtain high purity oxygen. This process, however, is inefficient and costly unless performed on a very large scale. Electrolysis of water is energy intensive, and results in the production of by-product hydrogen. Chemical oxygen separation processes, such as those using an oxygen acceptor and/or an oxygen scavenger, require the use of corrosive chemicals.

An oxygen separation method described in U.S. Pat. No. 4,738,760 to Marianowski et al., is the electrochemical separation of oxygen from oxygen containing gaseous mixtures, such as air, using a molten nitrate salt electrolyte retained in a porous matrix between two gas porous catalytic electrodes. U.S. Pat. No. 5,007,992 to Weber, describes a method of oxygen separation using an electrolytic ceramic cell made of partially stabilized zirconia, which when activated by heat and an electric current, selectively transports oxygen.

The separation of gases by membranes has been proposed but most membranes are not practical because of low selectivity. Polymer membranes can be used to separate oxygen from air but the oxygen concentration that can be obtained with their use is limited to between 30 to 40%.

Oxygen is separated for use in situ in some instances by methods which employ a gas impermeable membrane capable of conducting oxygen ions and oxygen electrons. Generally, these membranes are comprised of metal oxide or ceramic materials and operate at varying temperatures and pressures.

The use of electrochemical membranes that are gas tight and selective to oxygen are described in European Patent Application No. 90 111,503 (EP Publication 405,288) and in Japanese Patent Application No. 54 - 169,462 (Kokai 56-92, 103). These describe the use of a dense ceramic membrane that conducts both oxygen ions and electrons to separate pure oxygen from air. The solid membrane is disposed between a gas with a high concentration of oxygen (air) from a gas with a low concentration of oxygen (helium or a vacuum).

In such membrane systems, the gradient in oxygen concentration provides the driving force for the separation. Oxygen molecules at the air side of the membrane take up electrons to form oxygen ions, and the ions migrate through the membrane to the low concentration (He or vacuum) side of the membrane. The oxygen ions then give up their electrons to form molecular oxygen and the electrons migrate back to the air side of the membrane.

U.S. Pat. Nos. 5,240,473, 5,240,480, 5,261,932, and 5,269,822 teach oxygen ion transport membranes comprising multicomponent metallic oxides. Similarly, U.S. Pat. No. 5,273,628 to Liu et al. teaches an oxygen separation membrane comprised of bismuth oxide and ceria based ceramic materials in a variety of forms, and U.S. Pat. No. 5,108,465 to Bauer et al. teaches a membrane comprised of ceramics which can conduct both electrons and oxygen ions.

Materials having both electronic conductivity and oxygen ion conductivity are described in U.S. Pat. No. 4,330,633 to Yoshisato et al, and in Japanese patent publications 61-21717, 58-64258, 57-160967, 57-145070, and 57-123833.

U.S. Pat. No. 5,035,727 to Chen describes oxygen extraction by passing hot, compressed air over a solid electrolyte membrane selective to the permeation of oxygen and applying an external voltage across the membrane surface.

European Patent Application No. 399,833 by Mazanec et al describes oxygen separation using an electrochemical reactor cell having a solid multi-component membrane for conducting oxygen ions and electrons.

The disclosure of the above listed patents and patent applications are hereby incorporated by reference, as if fully written out hereinbelow.

A drawback of the above mentioned technologies is the difficulty in the fabrication of a gas-tight ceramic reactor. The most common reactor designs proposed are similar to a tube or a plate heat exchanger. High temperature seals for these apparatus represent a particular challenge. Large tube or plates of oxygen transport membranes are difficult to fabricate due to the brittleness of the material. Further, in operation, both the temperature and oxygen gradients across the membrane create stresses across the material.

Regarding the use of molecular oxygen, once molecular oxygen has been separated and concentrated, the storage and delivery (including transport) of high purity oxygen is also problematic and hazardous. The art does not teach the use of a single article for the combined separating, storing, and delivering of substantially pure molecular oxygen.

Thus, it is an object of the present invention to provide an article for separating, storing, and delivering substantially pure oxygen. It is another object of the present invention to provide a method for separating, storing, transporting, and delivering substantially pure oxygen. It is yet another object to provide an apparatus for the separation and utilization of substantially pure oxygen.

SUMMARY OF THE INVENTION

The present invention achieves the separation, storage and delivery of substantially pure oxygen through the use of an article comprising a gas-tight, closed walled, hollow container wherein a portion of at least one wall of the container comprises an oxygen separation material for providing substantially all transport of oxygen into and out of the container.

The present invention further includes a system or apparatus for the delivery of oxygen comprising means for transferring substantially pure oxygen from a fluid containing oxygen to the interior of at least one closed walled, hollow container to provide at least one substantially pure oxygen-bearing container. The invention further includes means for transporting the at least one substantially pure oxygen-bearing container to at least one of storage means and utilization or extraction means.

The present invention also includes a process for the separation, storage and delivery of substantially pure oxygen comprising filling an article with substantially pure oxygen, the article comprising a closed walled, hollow container wherein a portion of at least one wall of the container comprises an oxygen separation material for providing substantially all transport of oxygen into and out of the container via electrochemical transport of dissociated oxygen ions and electrons; and storing the substantially pure oxygen within the container for a selected period of time. The inventive process further includes releasing the oxygen from the container.

The present invention further provides a process for the purification of oxygen comprising exposing an article at elevated temperature to a fluid containing oxygen, the article comprising a closed walled, hollow container, wherein at least a portion of at least one wall of the container comprises a selective oxygen separation material which provides a sole means of transporting substantially all oxygen into the container by electrochemical transport of dissociated oxygen ions and electrons, and wherein the elevated temperature is at least equal to the oxygen transport temperature for the material, terminating contact of the container with the fluid and releasing substantially pure oxygen by exposing the container to the oxygen transport temperature.

The present invention also includes a process for the purification of a fluid containing oxygen as an impurity, including contacting an article at elevated temperature with the fluid, the article comprising a closed walled, hollow container, wherein at least a portion of at least one wall of the container comprises a selective oxygen separation material which provides a sole means for transporting substantially all oxygen into the container by electrochemical transport of dissociated oxygen ions and electrons, and wherein the elevated temperature is at least equal to the oxygen transport temperature for the material. In one embodiment, the fluid is a noble gas such as argon.

DETAILED DESCRIPTION OF THE INVENTION

Figure 1:
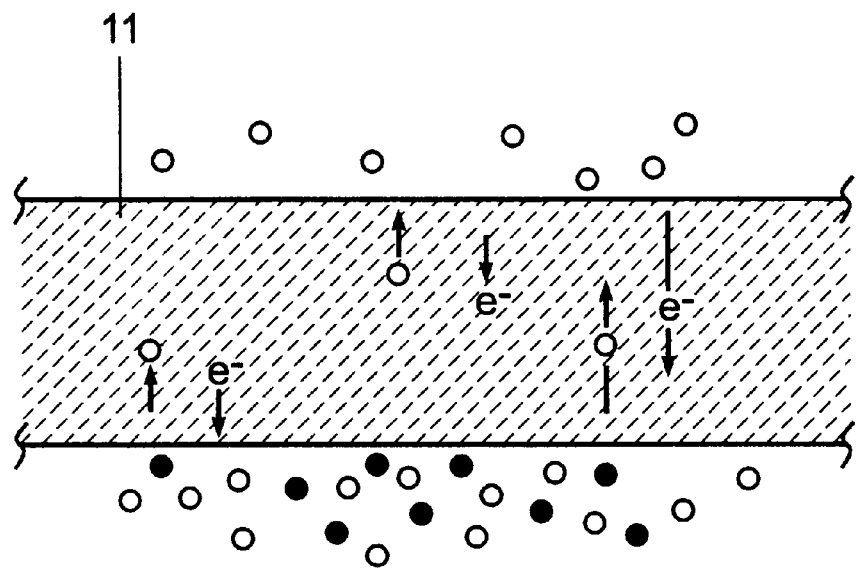
FIG. 1 is a sectional view of a single-phase, dense ceramic membrane that conducts both oxygen ions and electrons to separate pure oxygen from air.

The article of the present invention is capable of separating, storing and delivering substantially pure oxygen. Substantially pure oxygen is separated from a gaseous or liquid fluid containing oxygen and other gases or liquids, and is stored within the article. Substantially pure oxygen is then delivered to a desired destination while within the article and is released from the article. According to the present invention, oxygen is separated from oxygen containing fluids such as air and gaseous oxides, such as $SO_x$, $NO_x$ and $CO_x$.

The article of the present invention can be fabricated into a variety of shapes and sizes suited to a particular end use. These shapes include, but are not limited to, spheres, thin tubes, and thin sheets with numerous closed pores. The article, however, must be closed walled and configured so as to act as a gas-tight container for storing the oxygen. The hollow space within the container, in which the oxygen is stored, can comprise empty space or a porous material capable of absorbing molecular oxygen. In a preferred embodiment, the article of the present invention is fabricated into a hollow microsphere up to about 1000 microns in diameter or larger.

The article of the present invention comprises at least one wall, as in the case of a sphere, but may comprise a number of distinct walls depending on the geometry of the article. At least one of the above mentioned walls must be capable of separating substantially pure oxygen from a gaseous or liquid fluid mixture containing a mixture of oxygen and other gases or liquids. This wall will be referred to as the oxygen separation wall, and in part comprises means for transferring oxygen from a fluid having a relatively low concentration of oxygen to the container.

Separation of the substantially pure oxygen occurs as a result of dissociation of molecular oxygen into oxygen ions and electrons, and the electrochemical transport of the oxygen ions and electrons across the oxygen separation wall. The article of the present invention is gas-tight and nonporous, and therefore the only path for oxygen to enter the article is through the oxygen separation wall as a result of the dissociation and electrochemical transport of oxygen ions and electrons. Dissociation of molecular oxygen occurs at the surface of the oxygen separation wall as a result of temperature and pressure conditions, and optionally by catalysis induced by the material from which the oxygen separation wall is comprised. Electrochemical transport across the oxygen separation wall is also initiated and driven by temperature, pressure, and oxygen concentration conditions.

The temperature at which oxygen ions and electrons are transported across the oxygen separation wall is a function of the material used for the oxygen separation wall. Typically, materials are chosen that electrochemically transport oxygen ions and electrons at elevated temperatures, thus transport of the oxygen ions and electrons can be controlled based on temperature conditions. For example, below the oxygen transport threshold temperature for a given material, oxygen dissociation and ionic and electronic transport ceases. The nonporous material of the walls, including the oxygen separation wall, substantially prevents oxygen from escaping. Furthermore, due to thermodynamics, oxygen ions migrate across the oxygen separation wall from an environment having a higher oxygen partial pressure to an environment having a lower oxygen partial pressure, while electrons migrate in the opposite direction to conserve charge. Thus, the direction of oxygen ion and electron flow can also be controlled according to Le Chatelier's principle.

Once electrochemically transported across the oxygen separation wall, the oxygen ions and electrons recombine to form molecular oxygen. This molecular oxygen is stored within the gas-tight walls of the article (container) for a selected period of time while being delivered in the container to a desired location for storage or utilization of the oxygen. Storage can be for an indefinite period of time. Removal of the oxygen from the article is achieved by various methods, including physical destruction of the article, the breaking of a seal to open an optional "capped" portion of the container, or by initiation of oxygen transport across the oxygen separation wall to the external environment having a lower partial pressure of oxygen than the interior of the container.

As with filling the article, oxygen transport across the oxygen separation wall to release oxygen from the container is typically initiated at a certain temperature and therefore can be controlled by altering temperature and pressure of the environment. For example, to release the oxygen the containers are heated to a temperature above the oxygen transport temperature (about 400° C. to about 1100° C., and for certain materials above about 600° C. to about 1000° C.), and are exposed to an environment of low oxygen concentration such as a vacuum or a stream of helium to produce pure oxygen, or a stream of air to produce a stream of enriched-oxygen air which may be used in commercial applications.

As mentioned above, the rate at which oxygen dissociates into ions and electrons and are transported through the oxygen separation material is typically a function of the temperature and pressure. Generally, the article of the present invention can be filled by exposure to as great an oxygen pressure difference as possible, such as to pressures in the range of 5 to 1000 atm, and at temperatures in the range of about 400° C. to about 1100° C., preferably about 600° C. to about 1000° C. However, oxygen transport will be driven at elevated temperatures so long as the partial pressure of oxygen inside the container is less than the external partial pressure of oxygen. To store the oxygen the articles are cooled to below the oxygen transport temperature (about 20° C. to about 300° C., depending on the material), whereby the oxygen can be stored indefinitely inside the container.

Alternatively, the filled containers can be held at temperature, and the oxygen utilized by changing the environment in which they are disposed. For example, the gas from which the oxygen was separated could be purged, and a vacuum or acceptor fluid (gaseous and/or liquid) introduced for uptake of the contained oxygen via reverse transport across the oxygen transport material, or by another oxygen release method, as described above.

The oxygen separation wall can comprise materials that are single phase or multi-phase. A single phase system consists of a homogenous material whereby both oxygen ion and electron transport occurs via the homogenous material. A multi-phase system consists of a blend of two or more components. At least one component transports oxygen ions, and at least one component transports electrons. Most preferably the oxygen separation material is selective for oxygen, such that pure oxygen is separated and can be stored. The article of the present invention can therefore be used for the purification of oxygen.

An oxygen separation wall 11 comprised of a single phase system can include any material that will transport both oxygen ions and electrons (mixed ionic/electronic conductors), as depicted in FIG. 1. Typically, these materials are selected from a variety of ceramic materials, preferably, ceramic materials from the perovskite family. The material selected can be chosen for a variety of reasons and end uses, including the temperature, pressure, rate at which oxygen transport is desired, and the melting point of the oxygen transport material.

Figure 2:
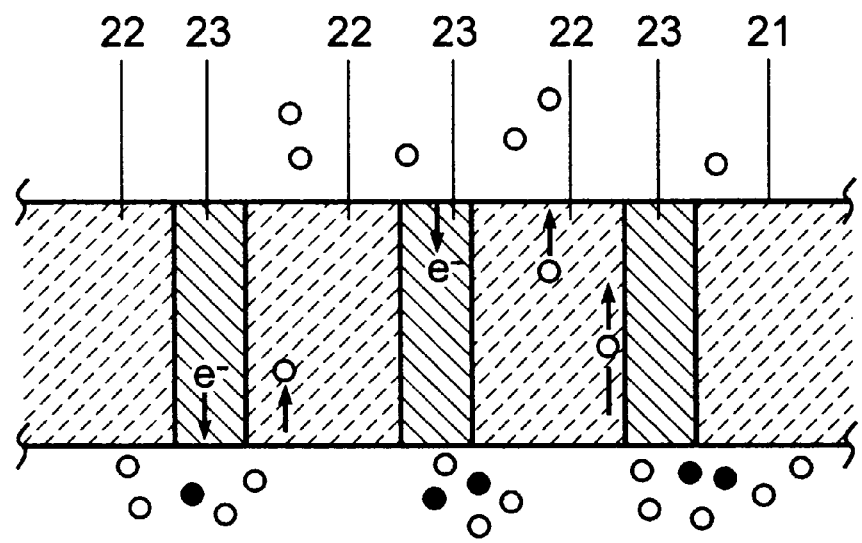
FIG. 2 is a sectional side view of a multi-phase, dense ceramic membrane that conducts both oxygen ions and electrons to separate pure oxygen from air.

In other embodiments of the invention, at least one oxygen separation wall 21 of the article includes a multi-phase system comprising an oxygen ion conducting material 22 and an electron conducting material 23, as shown in FIG. 2. The electron conducting material 23 can comprise electronically conducting metals or electronically conducting oxides.

Table I lists electronic, ionic, and mixed ionic/electronic conductors which are useful as oxygen separation or transport materials or membranes according to the present invention.

Table I

| | Electronic Conductors |
|---|---|
| I. | Metals such as Ag, Co, Cr, Cu, Fe, Ni, Pd, Pt, Zn, and the like, and alloys and mixtures thereof; |
| II. | Oxides of the general formula $M_yM'_{1-y}O_x$, wherein at least one M element is different than at least one M' element, M is selected from Ba, Li, Nb, Pr, Sn, Sr, and mixtures thereof, M' is selected from In, Nb, Ni, Ti and mixtures thereof, $0 \leq y \leq 1$ and x is a number which satisfies the valence requirements of the other elements; |
| III. | Perovskites of the general formula $(A_{1-a}A'_a)(B_bB'_{1-b})O_{3-c}$, wherein A is selected from lanthanides, La, Y, Nb, Ta, Pb or mixtures thereof, A' is selected from alkaline earth metals such as Ba, Ca, Mg, Sr and mixtures thereof, B is selected from lanthanides and mixtures thereof, and B' is selected from Al, Bi, Cr, Co, Cu, Fe, Mn, Nb, Ti, Zr, and mixtures thereof, wherein $0.9 \leq (A + A')/(B + B') \leq 1.1$, preferably $0.99 \leq (A + A')/(B + B') \leq 1.01$; and wherein $0 \leq a \leq 1$; $0 \leq b \leq 1$; and c is a number that renders the composition charge neutral; |
| | Ionic and Mixed Ionic/Electronic Conductors |
| IV. | Oxides of the general formula $Me_yMe'_{1-y}O_x$, wherein at least one Me element is different than at least one Me' element, wherein Me is selected from Group 2a and 3a (IUPAC) metals, lanthanides, Nb, Pb, Sn, Ta, and mixtures thereof, Me' is selected from Bi, Ce, In, Th, U, Zr, and mixtures thereof; |
| V. | Perovskites of the general formula $(D_{1-d}D'_d)(E_eE'_{1-e})O_{3-f}$, wherein D is selected from lanthanides, La, Y, Nb, Ta, and mixtures thereof, D' is selected from alkaline earth metals such as Ba, Ca, Mg, Sr and mixtures thereof, E is selected from lanthanides and mixtures thereof, and E' is selected from Co, Cr, Cu, Fe, Ni, Zr and mixtures thereof, wherein $0.9 \leq (D + D')/(E + E') \leq 1.1$, preferably $0.99 \leq (D + D')/(E + E') \leq 1.01$; and wherein $0 \leq d \leq 1$; $0 \leq e \leq 1$; and f is a number that renders the composition charge neutral. |

The membrane compositions must be stable in the oxygen containing environments to which they are subjected.

In a preferred embodiment of the invention, at least one wall of the article is an oxygen separation wall which includes a single phase system comprised of a ceramic having the perovskite general formula of group V in Table I, wherein D is selected from La or Y, D' is selected from Sr, Ca, or Ba, and E' is selected from Fe, Cr, or Co. In other embodiments, the single phase system is selected from mixed oxides of Group IV of Table I, such as doped yttria stabilized zirconia, doped $CeO_2$, doped $ThO_2$, and doped $Bi_2O_3$ (the doping material being selected from at least one of the Me elements).

In an alternative preferred embodiment, a multi-phase conductor of the present invention comprises an electronic conducting metal or oxide and an ionic conducting material, in which the volume fraction ratio of electronic to ionic conductor is in the range of about 0.3:0.7 to about 0.7:0.3, such that a continuous phase of both the ionic and electronic materials are maintained. Preferred metals are selected from the group consisting Pt, Pd, Ag, and the like. Electronically conducting oxides are selected from doped $In_2O_3$, doped $TiO_2$, $YBa_2Cu_3O_{7-x}$, perovskites such as doped $LaCrO_3$, doped $LaMnO_3$, doped $SrTiO_3$, and other oxides that are electronically conductive under the oxygen transport conditions described above. In one embodiment, the ionic conducting material 22 is a ceramic oxide such as $ZrO_2$, doped $CeO_2$, doped $ThO_2$, doped $UO_2$, doped $Bi_2O_3$, or any other oxide that is a known oxygen ion conductor.

The multi-phase conductor membrane can be fabricated by physically mixing small particles of the ionic and electronic conducting materials using standard ceramic fabrication technologies, such that an intimate and well dispersed mixture is obtained. The mixture is then fabricated into a dense, gas-tight membrane in which there is a continuous, interconnected, electronic and ionic conducting phase.

Figure 3A:
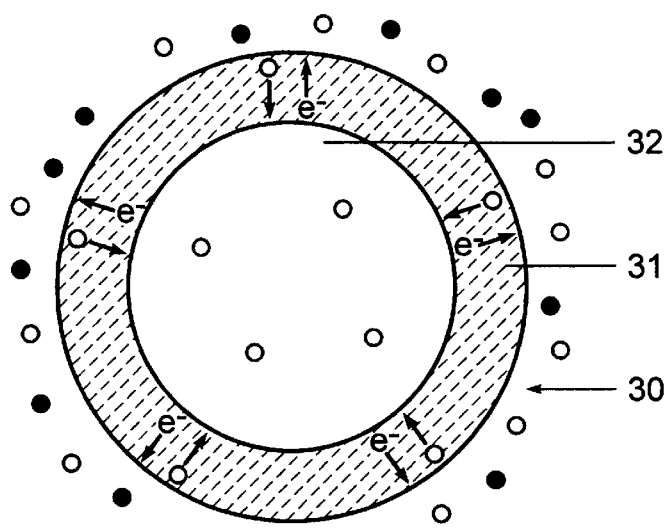
FIG. 3A is a cross-sectional view of a dense ceramic membrane microsphere being filled with oxygen by separation of oxygen from air.
Figure 3B:
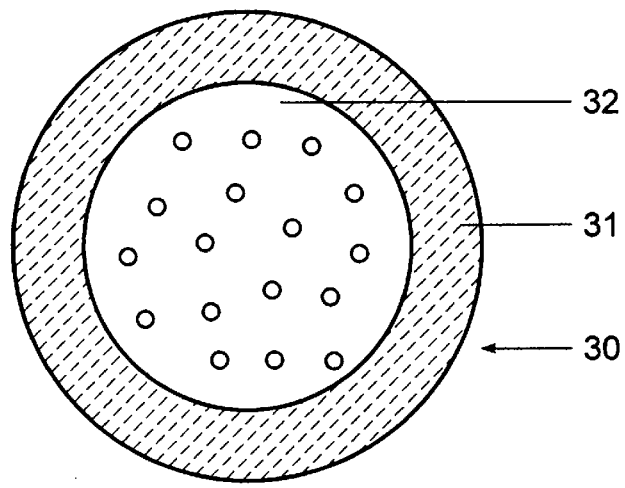
FIG. 3B is a cross-sectional view of a dense ceramic membrane microsphere, filled with oxygen for storage.
Figure 3C:
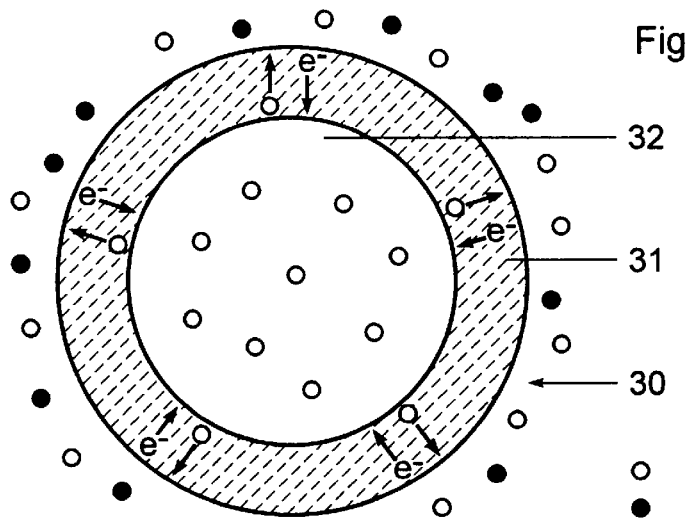
FIG. 3C is cross-sectional view of an oxygen containing dense ceramic membrane microsphere, being emptied of oxygen by transport of oxygen ions through the microsphere membrane.

In a preferred embodiment, the dense oxygen separation material is formed into hollow microspheres 30, shown in FIGS. 3A, 3B and 3C, by methods known in the art. For example, a powder is formed from the bulk material or its precursors, and the powder is flame sprayed such as by a gas flame or plasma torch. As the powder particulates melt, they are pulled into the shape of a sphere by surface tension and cool in that form.

Alternatively, powders of the bulk material or precursor, such as a gel material, are dropped in a heated tube. The particles melt, and a blowing agent or precursor decomposition products expand the forming sphere into a hollow shell which cools into a microsphere. In another microsphere production process, various means are used to form a stream of droplets from a precursor solution or emulsion, which droplets are heat treated to coalesce into spheres.

Exemplary methods of producing dense glass and ceramic spheres are described in Hendricks, C. D., "Glass Spheres", *Engineered Materials Handbook, Vol 4; Ceramics & Glasses*, ASM International, 1991, pages 418–422 and Service, R. F., "Small Spheres Lead to Big Ideas," *Science*, Vol 267, Jan. 20, 1995, pages 327–329.

As shown in FIG. 3A, a microsphere having a dense ceramic membrane 31, serving as a oxygen separation wall is being filled with oxygen by separation of oxygen from air at elevated temperature. Oxygen ions and electrons traverse the membrane 31 and oxygen molecules are formed on the interior 32 of the microsphere 30. As shown in FIG. 3B, microsphere 30 contains oxygen within the interior 32 of the dense ceramic membrane wall 31 for storage. In FIG. 3C, an oxygen containing dense ceramic membrane 31 microsphere 30 is being emptied of oxygen by transport of oxygen ions from the interior 32, and electrons through the microsphere dense ceramic membrane wall 31.

Figure 4A:
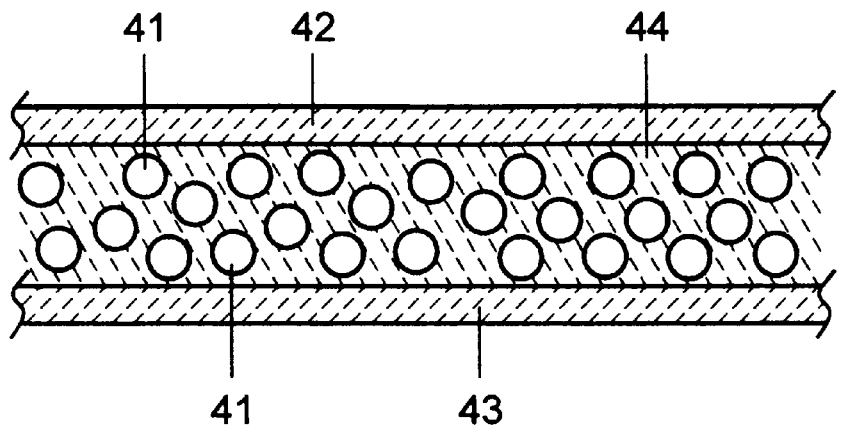
FIG. 4A is a cross-sectional view of oxygen separation membrane microspheres contained within an oxygen permeable material.

The oxygen separation and purification microspheres produced and used according to the present invention may be free-flowing, or may be constrained between plates of, or within a material which is porous or permeable to oxygen, and which can survive the oxygen transport temperature, such as a glass. Such a configuration is shown in FIG. 4A in which microspheres 41 are held between oxygen-permeable porous sheets or plates 42 and 43, the sheets or plates comprising at least one of ceramic, glass and metal. Although the void space between sheets or plates 42 and 43 not occupied by the packed microspheres can be empty, in one embodiment the voids between the plates 42, 43 and the microspheres 41 are filled with a porous oxygen permeable material 44.

Figure 4B:
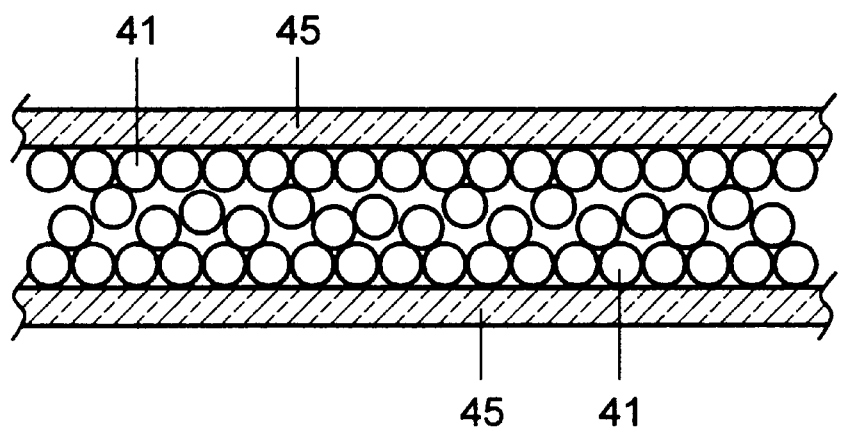
FIG. 4B is a cross-sectional view of oxygen separation membrane microspheres packed within a tube.

In another embodiment shown in FIG. 4B, the oxygen separation and purification microspheres 41 are packed within a tube 45, and gaseous or liquid fluid is passed through the tube to contact the microsphere 41 oxygen separation walls to surrender or accept oxygen.

Figure 5:
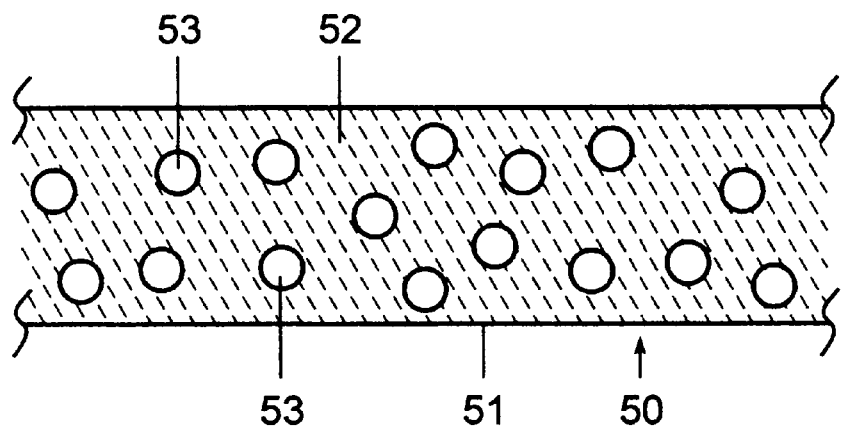
FIG. 5 is a cross-sectional view of a container comprising voids formed in situ within an oxygen separation material.

In yet a further embodiment, shown in FIG. 5, a container 50 having at least one oxygen separation wall 51 is produced by disposing wax or polymer beads of a desired size in an oxygen transport material precursor, forming the oxygen separation material 52, and burning out the beads to leave void cavities 53 within the oxygen separation material 52.

According to the present invention, substantially pure oxygen is separated from a gaseous or liquid mixture for storage and delivery. The non-porous article, or container, described above, having a selected oxygen separation wall as the only means of entry for oxygen is filled by exposing the container to the mixture at elevated temperature and an oxygen partial pressure greater than the interior of the container. Because of the selectivity of the oxygen separation wall, which comprises the single or multi-phase oxygen transport materials, only oxygen is introduced to the interior of the container, so that substantially pure oxygen can be obtained from the mixture. Once the container is filled with the desired amount or concentration of oxygen, the environmental conditions are changed so as to terminate oxygen dissociation and transport, thereby trapping the molecular oxygen within the container.

The oxygen filled container can store the oxygen indefinitely at temperatures below about 300° C. to about 600° C., such as room temperature or below, depending on the oxygen separation material utilized in the oxygen transport wall and its minimum oxygen transport temperature. The containers themselves can be stored in chambers such as bins, tanks or tubes and the like until required for delivery of oxygen by its release from the container.

With the oxygen stored in the stable dense or nonporous containers, the danger of oxygen release from the storage chamber is substantially lessened. In the event of a fire occurring near or in the storage chamber, oxygen would be released from the containers at a controlled rate (dependent upon the material, temperature, and oxygen concentration) and the danger of explosion would be averted.

The oxygen filled containers are transported by conventional means, such as being pumped in a dry condition or in a slurry, or transported by conveyor for delivery to the desired location for oxygen release and utilization. If used, the slurrying liquid can be a raw material or reaction medium for the oxygen utilizing reaction or process.

Once delivered to a desired destination, the molecular oxygen can be released by exposing the container to a temperature that initiates electrochemical dissociation of the stored oxygen and promotes transport of the oxygen ions out of the container through the oxygen transport material (separation wall) to an environment of lower oxygen partial pressure. Alternatively, oxygen stored within the container is released by opening a capped port or by crushing or otherwise rupturing the wall of the container. The container can have a port for releasing oxygen, but not for entry, as it would otherwise admit non-oxygen constituents into the container during filing and would not permit oxygen purification.

In one embodiment of the invention, microspheres formed from oxygen transport material are placed into a chamber which is sealed from the outer environment. A fluid such as air, containing molecular oxygen is introduced into the chamber. The temperature is elevated to initiate dissociation of the molecular oxygen and transport of oxygen ions across the oxygen separation wall of the microspheres. Optionally, the pressure within the chamber is increased to facilitate electrochemical transport of oxygen across the oxygen separation wall.

Upon filling of the microspheres with pure molecular oxygen to the desired concentration or partial pressure, the temperature and pressure within the chamber are lowered to ambient conditions to terminate ion and electron transport across the oxygen separation wall, thereby trapping molecular oxygen within the microsphere. The microspheres may be stored in the chamber or conveyed to a storage chamber indefinitely, for later delivery to an oxygen demand location.

Alternatively, the microspheres can be utilized in situ by releasing pure oxygen into a vacuum, or a gaseous or liquid fluid introduced into the chamber, by increasing the temperature of the microspheres' oxygen transport walls. In an alternative embodiment, the microspheres can be transported after filling directly to a destination or utilization chamber, where oxygen is released from the microspheres and delivered to an oxygen demand situation, as described above. In still another embodiment of the invention, the oxygen can be utilized in situ, substantially without cooling, by removing the oxygen donor fluid and replacing it with a vaccuum or an oxygen acceptor fluid, as described above.

Locations, or environments where delivery of oxygen via the filled container is desired include low oxygen environments such as a vacuum or helium for oxygenation, atmospheric air for oxygen enrichment, chemicals for oxidation and fuel for combustion.

In another process utilizing oxygen separation articles according the present invention, oxygen which is present in a fluid as an impurity can be removed at the oxygen transport temperature in order to purify the fluid. For example, oxygen can be separated from a noble gas such as argon, an otherwise difficult separation, by contacting argon with oxygen separation microspheres at the oxygen transport temperature to take up the oxygen present, thereby purifying the argon. Oxygen can similarly be removed from other environments where the presence of oxygen may be undesirable, such as in semiconductor processing apparatus.

The use of oxygen separation microspheres overcomes the problems of oxygen separation material brittleness, and temperature and oxygen gradient stresses, as the entire wall of the microsphere sees substantially the same temperature and oxygen concentration.

Thus, the objects of the invention are accomplished by the present invention, which is not limited to the specific embodiments described above, but which includes variations, modifications and equivalent embodiments defined by the following claims.

We claim:

1. A process for the separation, storage and delivery of substantially pure oxygen gas comprising:

filling an article with substantially pure oxygen gas, the article comprising a gas-tight, closed walled, hollow container wherein at least a portion of at least one wall of the article comprises a selective oxygen separation material which provides a sole means of transporting substantially all oxygen gas from a fluid into the article by electrochemical transport of dissociated oxygen ions and electrons, wherein said filling the article with substantially pure oxygen gas includes exposing the article to elevated temperature in a partial pressure of oxygen in excess of the oxygen partial pressure of the interior of the article; and, storing the substantially pure oxygen gas within the article for a selected period of time.

2. The process of claim 1 further comprising releasing the stored oxygen from the article.

3. The process of claim 2 wherein said releasing the stored oxygen includes rupturing a wall of the article.

4. The process of claim 2 wherein said releasing the stored oxygen includes electrochemically transporting oxygen ions across the oxygen separation material to the exterior of the article.

5. The process of claim 1 wherein said article comprises a plurality of microspheres.

6. A process for the purification of oxygen gas from a fluid comprising:

contacting an article at elevated temperature with a fluid containing oxygen gas to trap substantially pure oxygen gas within the article, the article comprising a gas-tight, closed walled, hollow container, wherein at least a portion of at least one wall of the article comprises a selective oxygen separation material which provides a sole means of transporting substantially all oxygen gas from the fluid into the article by electrochemical transport of dissociated oxygen ions and electrons, and wherein the elevated temperature is at least equal to an oxygen transport temperature for the material; and, terminating contact of the article with the fluid.

7. The process as in claim 6, further comprising releasing the trapped substantially pure oxygen to at least one of a vacuum and a second fluid of lower oxygen partial pressure than the article, by exposing the article to the oxygen transport temperature.

8. The process as in claim 6, further comprising releasing the trapped substantially pure oxygen to at least one of a vacuum and a second fluid of lower oxygen partial pressure than the article, by rupturing a wall of the article.

9. The process as in claim 6 wherein the article comprises a plurality of microspheres.

10. A process for the purification of a fluid containing oxygen gas as an impurity, comprising:

contacting an article at elevated temperature with the fluid to trap the oxygen within the article, the article comprising a gas-tight, closed walled, hollow container, wherein at least a portion of at least one wall of the article comprises a selective oxygen separation material which provides a sole means of transporting substantially all oxygen gas from the fluid into the article by electrochemical transport of dissociated oxygen ions and electrons, and wherein the elevated temperature is at least equal to an oxygen transport temperature for the material.

11. The process as in claim 10 wherein the article comprises a plurality of microspheres.

12. The process as in claim 10 wherein the fluid comprises a noble gas.

13. The process as in claim 12 wherein the noble gas is argon.

14. The process as in claim 1, 6, or 10, wherein the oxygen separation material is a dense, ceramic membrane capable of conducting both oxygen ions and electrons, and wherein the ceramic membrane comprises at least one of a) perovskite, and b) mixed oxide.

15. The process as in claim 1, 6, or 10, wherein the oxygen separation material is a dense, multi-phase membrane capable of conducting both oxygen ions and electrons, and wherein the oxygen separation material comprises at least one electronic conductor and at least one ionic conductor in a volume fraction of about 0.3:0.7 to about 0.7:0.3.

16. The process as in claim 1, 6, or 10, wherein the oxygen separation material comprises at least one of a) mixed ionic/electronic conductor, b) electronic conductor and ionic conductor, and c) combinations of a) with at least one of said electronic conductor and said ionic conductor; wherein a), b) and c) are selected from:

I. Ag, Co, Cr, Cu, Fe, Ni, Pd, Pt, Zn, alloys thereof and mixtures thereof;

II. Oxides of the general formula $M_y M'_{1-y} O_x$, wherein at least one M element is different than at least one M' element, M is selected from the group consisting of Ba, Li, Nb, Pr, Sn, Sr, and mixtures thereof, M' is selected from the group consisting of In, Nb, Ni, Ti and mixtures thereof, $0 \leq y \leq 1$ and x is a number which satisfies the valence requirements of the other elements;

III. Perovskites of the general formula $(A_{1-a}A'_a)(B_b B'_{1-b})O_{3-c}$, wherein A is selected from the group consisting of lanthanides, La, Y, Nb, Ta, Pb or mixtures thereof, A' is selected from the group consisting of alkaline earth metals and mixtures thereof, B is selected from the group consisting of lanthanides and mixtures thereof, and B' is selected from the group consisting of Al, Bi, Cr, Co, Cu, Fe, Mn, Nb, Ti, Zr, and mixtures thereof, wherein $0.9 \leq (A+A')/(B+B') \leq 1.1$; and wherein $0 \leq a \leq 1$; $0 \leq b \leq 1$; and c is a number that renders the composition charge neutral;

IV. Oxides of the general formula $Me_y Me'_{1-y} O_x$, wherein at least one Me element is different than at least one Me' element, wherein Me is selected from the group consisting of Group 2a and 3a (IUPAC) metals, lanthanides, Nb, Pb, Sn, Ta, and mixtures thereof, Me' is selected from the group consisting of Bi, Ce, In, Th, U, Zr, and mixtures thereof;

V. Perovskites of the general formula $(D_{1-d}D'_d)(E_e E'_{1-e})O_{3-f}$, wherein D is selected from the group consisting of lanthanides, La, Y, Nb, Ta, and mixtures thereof, D' is selected from the group consisting of alkaline earth metals and mixtures thereof, E is selected from the group consisting of lanthanides and mixtures thereof, and E' is selected from the group consisting of Co, Cr, Cu, Fe, Ni, Zr and mixtures thereof, wherein $0.9 \leq (D+D')/(E+E') \leq 1.1$; and wherein $0 \leq d \leq 1$; $0 \leq e \leq 1$; and f is a number that renders the composition charge neutral.

* * * * *